United States Patent
Jentzsch et al.

(10) Patent No.: US 8,554,130 B1
(45) Date of Patent: Oct. 8, 2013

(54) METHOD AND APPARATUS TO PROVIDE MACHINE-ASSISTED TRAINING

(75) Inventors: Eyck Jentzsch, Bavaria (DE);
Wolf-Ekkehard Matzke, Bavaria (DE)

(73) Assignee: Cadence Design Systems, Inc., San Jose, CA (US)

( * ) Notice: Subject to any disclaimer, the term of this patent is extended or adjusted under 35 U.S.C. 154(b) by 497 days.

(21) Appl. No.: 10/942,287

(22) Filed: Sep. 15, 2004

(51) Int. Cl.
*G09B 1/00* (2006.01)

(52) U.S. Cl.
USPC ........... 434/362; 434/118; 434/322; 434/323; 434/350; 434/353

(58) Field of Classification Search
CPC ....................................................... G09B 1/00
USPC .......... 345/173; 434/118, 219, 236, 308, 322, 434/323, 335, 350, 362, 247, 353; 482/8; 705/2, 11; 706/59; 709/201, 203, 249; 715/500, 513, 707, 762
See application file for complete search history.

(56) References Cited

U.S. PATENT DOCUMENTS

| | | | |
|---|---|---|---|
| 4,622,013 A * | 11/1986 | Cerchio | 434/118 |
| 5,210,859 A * | 5/1993 | Aoshima et al. | 714/46 |
| 5,388,993 A * | 2/1995 | McKiel et al. | 434/118 |
| 5,395,243 A * | 3/1995 | Lubin et al. | 434/118 |
| 5,421,730 A * | 6/1995 | Lasker et al. | 434/118 |
| 5,441,415 A * | 8/1995 | Lee et al. | 434/350 |
| 5,597,312 A * | 1/1997 | Bloom et al. | 434/362 |
| 5,602,982 A * | 2/1997 | Judd et al. | 715/709 |
| 5,697,788 A * | 12/1997 | Ohta | 434/118 |
| 5,784,553 A * | 7/1998 | Kolawa et al. | 714/38.1 |
| 5,934,909 A * | 8/1999 | Ho et al. | 434/362 |
| 5,957,699 A * | 9/1999 | Peterson et al. | 434/350 |
| 6,014,134 A * | 1/2000 | Bell et al. | 715/705 |
| 6,024,577 A * | 2/2000 | Wadahama et al. | 434/322 |
| 6,029,156 A * | 2/2000 | Lannert et al. | 706/11 |
| 6,039,575 A * | 3/2000 | L'Allier et al. | 434/323 |
| 6,077,085 A * | 6/2000 | Parry et al. | 434/322 |
| 6,149,441 A * | 11/2000 | Pellegrino et al. | 434/350 |
| 6,186,794 B1 * | 2/2001 | Brown et al. | 434/116 |
| 6,196,846 B1 * | 3/2001 | Berger et al. | 434/118 |
| 6,201,948 B1 * | 3/2001 | Cook et al. | 434/350 |
| 6,347,943 B1 * | 2/2002 | Fields et al. | 434/118 |
| 6,368,110 B1 * | 4/2002 | Koenecke et al. | 434/219 |
| 6,554,618 B1 * | 4/2003 | Lockwood | 434/322 |
| 6,594,466 B1 * | 7/2003 | Harned et al. | 434/350 |
| 6,606,479 B2 * | 8/2003 | Cook et al. | 434/350 |
| 6,634,887 B1 * | 10/2003 | Heffernan et al. | 434/322 |
| 6,679,703 B2 * | 1/2004 | Alling | 434/219 |
| 6,755,659 B2 * | 6/2004 | LoSasso et al. | 434/219 |
| 6,925,601 B2 * | 8/2005 | Moore et al. | 715/707 |
| 6,978,115 B2 * | 12/2005 | Whitehurst et al. | 434/350 |
| 6,996,366 B2 * | 2/2006 | L'Allier et al. | 434/362 |

(Continued)

OTHER PUBLICATIONS

IEEE Standard SystemC Language Reference Manual. IEEE. Mar. 2006. 441 pages.

*Primary Examiner* — Xuan Thai
*Assistant Examiner* — Alvin Carlos
(74) *Attorney, Agent, or Firm* — Alford Law Group, Inc.; Vy Vu

(57) ABSTRACT

A method and an apparatus to provide machine-assisted training have been disclosed. In one embodiment, the method includes monitoring action performed by a trainee during machine-assisted training and dynamically adjusting the machine-assisted training in response to the trainee's action. Other embodiments have been claimed and described.

23 Claims, 9 Drawing Sheets

(56) References Cited

U.S. PATENT DOCUMENTS

| | | | |
|---|---|---|---|
| 2002/0168616 A1* | 11/2002 | Chan et al. | 434/118 |
| 2002/0188583 A1* | 12/2002 | Rukavina et al. | 706/45 |
| 2003/0018460 A1* | 1/2003 | Yang | 703/14 |
| 2004/0018479 A1* | 1/2004 | Pritchard et al. | 434/350 |
| 2004/0086834 A1* | 5/2004 | Harned et al. | 434/118 |
| 2004/0259060 A1* | 12/2004 | Kumar et al. | 434/118 |

* cited by examiner

Initial Questionaire

| How do you create a module in SystemC? | Name a primitive channel (without <>) | How do you declare a modules interface in SystemC? |
|---|---|---|
| ○ by calling sc_main() <br> ○ by using the SC_CTOR macro <br> ○ by deriving a class from sc_module | [ ] | ○ by adding channel members derived from sc_channel <br> ○ by adding argument to the constructor <br> ○ by adding port members derived from sc_port |
| Name a process type in SystemC (capitals!) <br> [ ] | What does "void f(int &c);" mean? <br> ○ A function f with no return value and one argument of type pointer to int <br> ○ A function f with no return value and one argument of type reference to int <br> ○ A function f with no return value and one argument of type int | What the difference between a struct and a class? <br> ☐ Class members are public, struct members are private by default <br> ☐ Class members are private, struct member are public by default <br> ☐ Only classes can be derived <br> ☐ Only classes can have functions |
| What is the return type of a Constructor of class T? <br> ○ T <br> ○ void <br> ○ none <br> ○ T* | What means "protected" for a class member? <br> ○ Everyone can access it <br> ○ Only the class can access it <br> ○ The class and all derived classes can access it | What happens if one driver drives high and another one low? <br> ○ You get an error <br> ○ You get high <br> ○ You get low <br> ○ You get undefined |
| How do you break down your design? <br> ○ With tasks <br> ○ With modules <br> ○ With procedures | What is sensitivity? <br> ○ The amount time between the arrival of a signal and the next clock edge <br> ○ A list of signal that will reactivate a process <br> ○ Sensitivity to power fluctuations | What is a 4 valued logic? <br> ○ A fuzzy logic with 4 values <br> ○ A logic with low, medium, high and unknown <br> ○ A logic with low, high, unknown and high impediance | submit Questionaire

© 2004 Cadence Design Systems, Inc

Figure 4

| cadence | Fundamentals of SystemC<br>Welcome, Test User | Questionaire 3: C++ Language Refresher |

CONTENTS　GLOSSARY　MY NOTES　BOOKMARKS　SUPPORT　HELP　LOGOUT　EXIT

C++ Language Refresher

| What is a template class?<br>○ A special type of class<br>○ A generator for normal classes<br>○ Just a concept | What do you need to do to make a function 'pure virtual'?<br>☐ add 'pure virtual' keyword<br>☐ add 'virtual' keyword<br>☐ set function 0 ('=0')<br>☐ add 'abstract' keyword |
|---|---|
| What the difference between a struct and a class?<br>☐ Class members are public, struct members are private by default<br>☐ Class members are private, struct member are public by default<br>☐ Only classes can be derived<br>☐ Only classes can have functions | What is true about abstract base classes?<br>☐ Makes all derived classes abstract<br>☐ Has at least one pure virtual function<br>☐ Must be derived virtual |
| What does function overloading mean?<br>○ Making a function faster by replacing its calls with its code<br>○ Defining several functions with the same name<br>○ Replacing a function of a base class with a new one | Who can access a protected class member?<br>☐ Everyone<br>☐ Derived classes<br>☐ The class itself | submit Questionaire

© 2004 Cadence Design Systems, Inc

Figure 5

Excerpt Corresponding to a High Knowledge Level:

SystemC is a C++ class library which extends the C++ programming language with hardware-like data types and structuring. In addition it provides a digital simulation kernel. In order to be effective with its usage you should be comfortable with Object-Oriented Programming.

The SystemC language contains constructs which allow you to model the behavior of multiple hardware sub-modules that interact concurrently.

SystemC provides a discrete-time based digital simulation kernel, i.e. it allows adding time delay information to the models developed by the designer. Time delays can be added in processes, which can be suspended and resumed after a specific amount of time.

Figure 7A

Excerpt Corresponding to a Medium Knowledge Level:

SystemC is a C++ class library which extends the C++ programming language with hardware-like data types and structuring. In addition it provides a digital simulation kernel. In order to be effective with its usage you should be comfortable with Object-Oriented Programming.

The SystemC language contains constructs which allow you to model the behavior of multiple hardware sub-modules that interact concurrently.

The divide and conquer approach typical in both hardware and software engineering is supported in SystemC by offering:

- Hardware designers the possibility to instantiate multiple hardware modules inside an enclosing module and to interconnect these with signals (SystemC channels)
- Software designers the possibility to structure the code using sub-program calls, as they are already used to.

SystemC provides a discrete-time based digital simulation kernel, i.e. it allows adding time delay information to the models developed by the designer. Time delays can be added in processes, which can be suspended and resumed after a specific amount of time.

Figure 7B

Excerpt Corresponding to a Low Knowledge Level:

SystemC is a C++ class library which extends the C++ programming language with hardware-like data types and structuring. In addition it provides a digital simulation kernel. In order to be effective with its usage you should be comfortable with Object-Oriented Programming.

Object-Oriented Programming (OOP) is a programming paradigm which aggregates the internal representation of a user defined data type and the operations which are allowed on it (encapsulation). Two other basic concepts of OOP are: inheritance and polymorphism. Inheritance is the operation of deriving one data type from a base one; the derived data type contains all public and protected data fields and methods of the base data type plus the specific ones which are added in its definition. Polymorphism is the operation of providing a different implementation in a derived user defined data type of a method which was already in the base data type; this allows you to provide in the base class a consistent interface for a hierarchy of objects.

The SystemC language contains constructs which allow you to model the behavior of multiple hardware sub-modules that interact concurrently.

It is typical for hardware engineers to split the design of the device in sub-modules that will be assembled together and connected in a higher level of the design hierarchy.

The behavior of the interacting hardware modules can be captured in "processes" which interact concurrently, i.e. their bodies execute in the same simulated physical time.

The statements inside processes are executed sequentially, as in software procedures.

The divide and conquer approach typical in both hardware and software engineering is supported in SystemC by offering:

- Hardware designers the possibility to instantiate multiple hardware modules inside an enclosing module and to interconnect these with signals (SystemC channels)
- Software designers the possibility to structure the code using sub-program calls, as they are already used to.

SystemC provides a discrete-time based digital simulation kernel, i.e. it allows adding time delay information to the models developed by the designer. Time delays can be added in processes, which can be suspended and resumed after a specific amount of time.

Figure 7C

METHOD AND APPARATUS TO PROVIDE MACHINE-ASSISTED TRAINING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention relates to machine-assisted training, and more particularly, to providing dynamically adjustable machine-assisted training.

BACKGROUND

As computing and communication technologies advance, the use of machine-assisted training (also known as eMedia training or distant learning) has become more popular and common. In general, machine-assisted training can be provided via the Internet or other communication media, which makes such training readily accessible. Furthermore, machine-assisted training can be stored on some form of portable machine-readable medium (e.g., compact disks) to allow trainees to take the training at a time and a location convenient for the trainees.

Currently, machine-assisted training generally includes a direct translation of class-based training into a set of presentation slides or pages (e.g., Hypertext Mark-up Language (HTML) pages). During some conventional machine-assisted training, these slides or pages are presented under the control of the trainee, i.e., self-paced. This conventional technique provides static content for each of the trainees using the same machine-assisted training regardless of the individual needs of the trainees. In order to accommodate beginners in the subject area of the machine-assisted training, the presentation slides or pages may include a lot of explanations even though much of the explanations may not be necessary for some of the more advanced trainees. Likewise, to accommodate trainees who want to gain a deeper level of understanding of the subject matter, the presentation slides or pages may include a lot of details, which may not be of any interest to some other trainees.

SUMMARY

The present invention includes a method and an apparatus to provide machine-assisted training. In one embodiment, the method includes monitoring action performed by a trainee during machine-assisted training and dynamically adjusting the machine-assisted training in response to the trainee's action.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 shows a sample initial questionnaire provided to a trainee;

FIG. 5 shows a sample questionnaire at the end of a chapter in one embodiment;

FIGS. 7A-7C show sample excerpts from one embodiment of the machine-assisted training.

DETAILED DESCRIPTION

A method and an apparatus to provide machine-assisted training are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
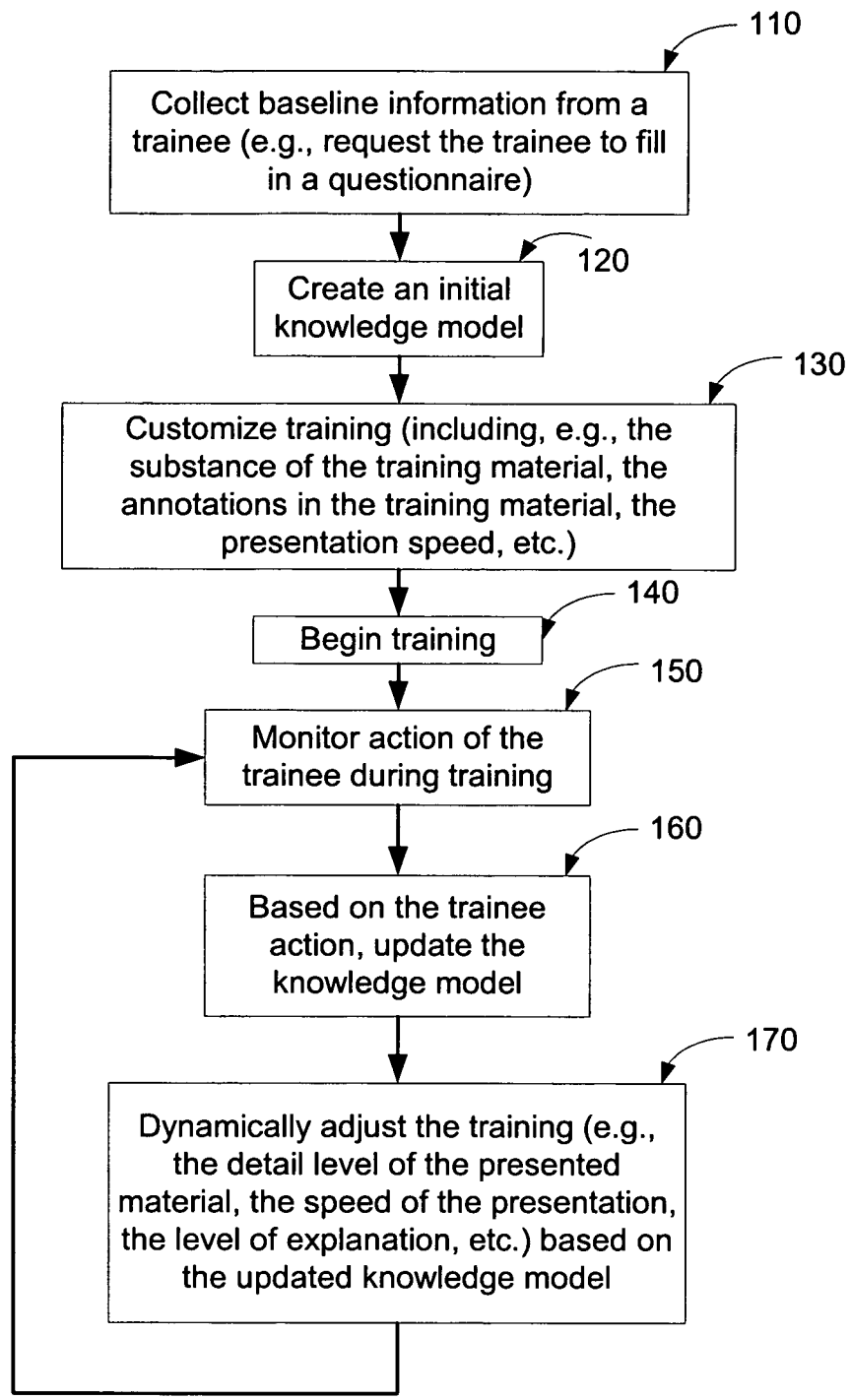
FIG. 1 illustrates a flow diagram of one embodiment of a process to provide machine-assisted training.

FIG. 1 shows a flow diagram of one embodiment of a process to provide machine-assisted training. In the following discussion, the terms "machine-assisted training" and "training" are used interchangeably. The process is performed by processing logic that may comprise hardware (e.g., circuitry, dedicated logic, etc.), software (such as a trainer application, also referred to as a trainer agent, operable to run on a general-purpose computer system or a dedicated machine), or a combination of both.

In one embodiment, processing logic collects baseline information from a trainee (processing block 110). The baseline information may include information that helps processing logic to determine the trainee's knowledge level in the pertinent subject matter and the level of detail the trainee wants to get into during the training.

One way to collect the baseline information is to provide an initial questionnaire to the trainee to be filled out before the training. A sample initial questionnaire is illustrated in FIG. 4. The questionnaire in FIG. 4 is an initial questionnaire for one embodiment of the training on the fundamentals of SystemC. The questionnaire includes questions on SystemC at different levels. Based on the trainee's answers to the questions, processing logic may determine the knowledge level of the trainee with respect to SystemC.

Figure 6:
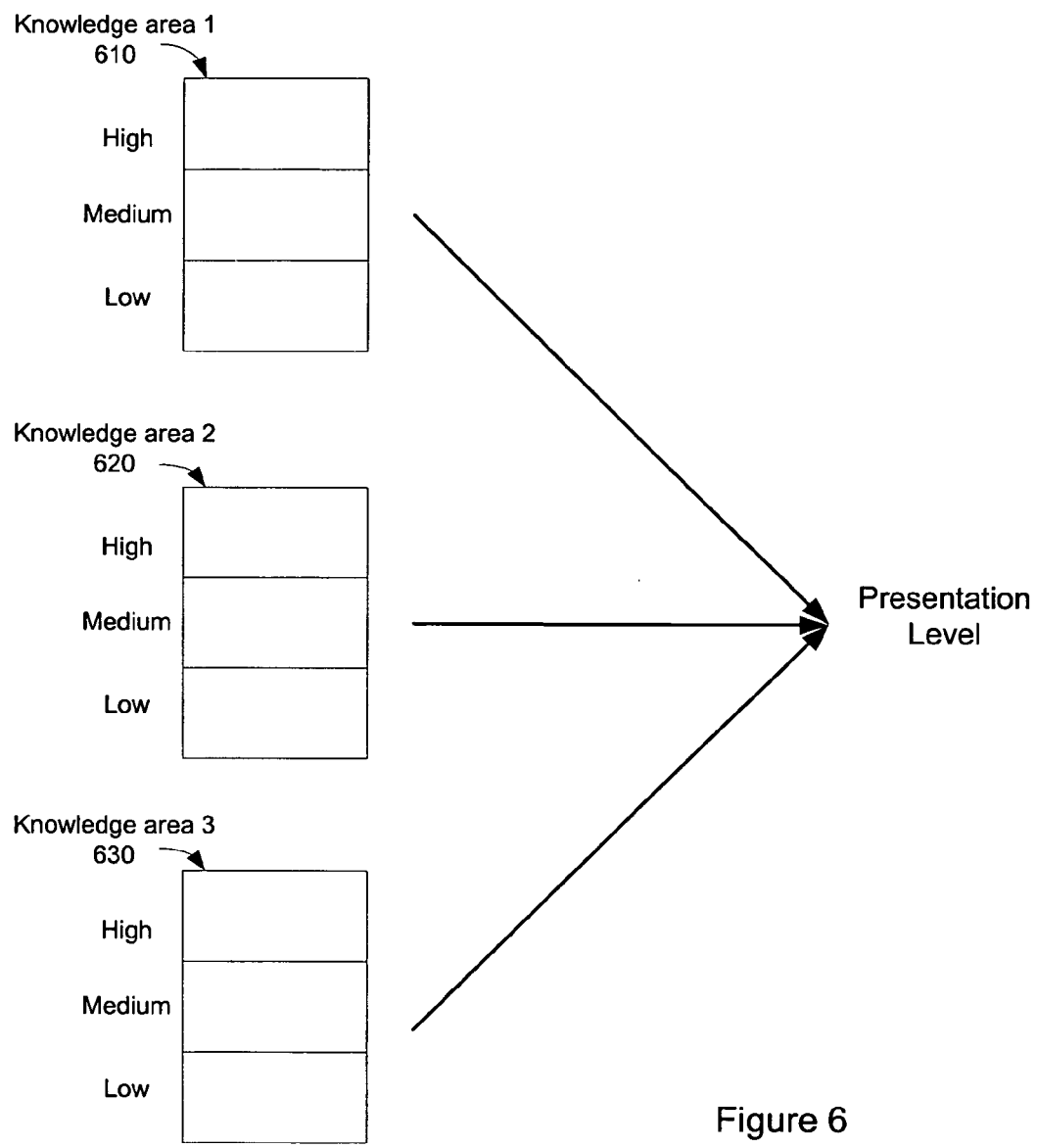
FIG. 6 shows a sample knowledge model.

Referring back to FIG. 1, processing logic creates an initial knowledge model using the baseline information collected (processing block 120). An exemplary knowledge model is shown in FIG. 6. Referring to FIG. 6, the exemplary knowledge model 600 defines three knowledge areas 610-630. Each knowledge area is further divided into three levels, namely, high, medium, and low. The level in each knowledge area is assigned based on the training content. The level may be changed in fractions based on the action of the trainee. Processing logic may integrate the level in each of the knowledge areas 610-630 to determine the presentation level of the training for the trainee.

Referring back to FIG. 1, processing logic customizes the training based on the baseline information collected (processing block 130). The training may be customized in various aspects, such as, for example, the substance of the presentation materials of the training, the annotations (e.g., notes, remarks, etc.) in the presentation materials, and the presentation speed of the training, etc. For example, FIGS. 7A-7C show some sample excerpts from one embodiment of the training on SystemC Language Introduction. FIG. 7A shows a sample excerpt for a trainee with a high knowledge level. FIG. 7B shows a sample excerpt for a trainee with a medium knowledge level. FIG. 7C shows a sample excerpt for a trainee with a low knowledge level. Comparing the excerpts corresponding to the high knowledge level and the medium knowledge level in FIGS. 7A and 7B, respectively, more detail on the divide and conquer approach supported in SystemC is included in the excerpt corresponding to the medium knowledge level. Likewise, the excerpt corresponding to the low knowledge level in FIG. 7C includes more detail on Object-Oriented Programming and sub-modules in hardware design.

After customizing the training, processing logic begins the training with the trainee (processing block 140). During the training, processing logic monitors action of the trainee (processing block 150). For example, processing logic may monitor how much detail on a certain topic the trainee requests. In some embodiments, processing logic may monitor the trainee's answers to questions presented at the end of a predetermined portion of the training, such as a chapter or a section. The questions may be designed to gauge or to evaluate the knowledge level of the trainee after the trainee has gone through the chapter or the section of the training. An exemplary questionnaire at the end of a chapter is shown in FIG. 5. Based on the trainee's answers to the questionnaire, processing logic may gauge or evaluate the knowledge level of the trainee after the trainee has gone through the chapter or the section.

Based on the monitored trainee action, processing logic updates the knowledge model (processing block 160). For example, referring to FIG. 6, the knowledge level in any of the knowledge areas 610-630 may be adjusted based on any change in the trainee's knowledge level. Any change in the level of any of the knowledge areas 610-630 may cause the presentation level of the training to change as well. Then processing logic dynamically adjusts the training based on the updated knowledge model (processing block 170).

Processing logic may adjust various aspects of the training to adapt or to tailor the training to the trainee's individual needs, such as the trainee's knowledge level in the relevant subject matter. For example, processing logic may adjust the detail level of the training material. If the trainee has requested more details on a certain subject matter in a previous chapter or section of the training, processing logic may provide more details on the subject matter in the next chapter or section. Another aspect that processing logic may adjust is the speed of the presentation. For example, if the trainee has demonstrated a level of knowledge in the subject matter of the training that exceeds a predetermined threshold, then processing logic may increase the speed of the presentation, and vice versa. Furthermore, if the trainee has performed poorly in the current chapter, processing logic may request the trainee to repeat the current chapter. Otherwise, processing logic may allow the trainee to move onto the next chapter.

Alternatively, processing logic may adjust the level of explanation in the training based on the trainee's action. For example, if the trainee has requested explanation of many basic terms or phrases used in a previous chapter of the training, processing logic may provide a higher level of explanation in the next chapter. In one embodiment, processing logic dynamically generates an exercise, a test, and/or a laboratory assignment at the end of a chapter in the training based on the trainee's action. Processing logic may also keep track of the individual problems in an exercise given to the trainee so that the trainee is not asked to repeat the same set of problems that the trainee had already done. One should appreciate that the examples discussed above are for only illustration, not limitation. Processing logic may adjust other aspects of the training based on the action performed by the trainee.

After dynamically adjusting the training, processing logic repeats processing block 150 as the trainee continues with the training. One advantage of the process described above is to allow customization of the training based on the trainee's individual needs and/or performance. On one hand, the trainee is not necessarily forced to go through detail that is not useful to the trainee. Therefore, the training time can be used more efficiently. On the other hand, the trainee is provided with more detail on subject matter that the trainee is interested in without the hassle of manually requesting such detail through out the training. Furthermore, by tailoring the training to the individual trainee, the training becomes more interesting to the trainee, and hence, the trainee is less likely to skip some of the presentation materials in the training, which may contain important information.

Figure 2:
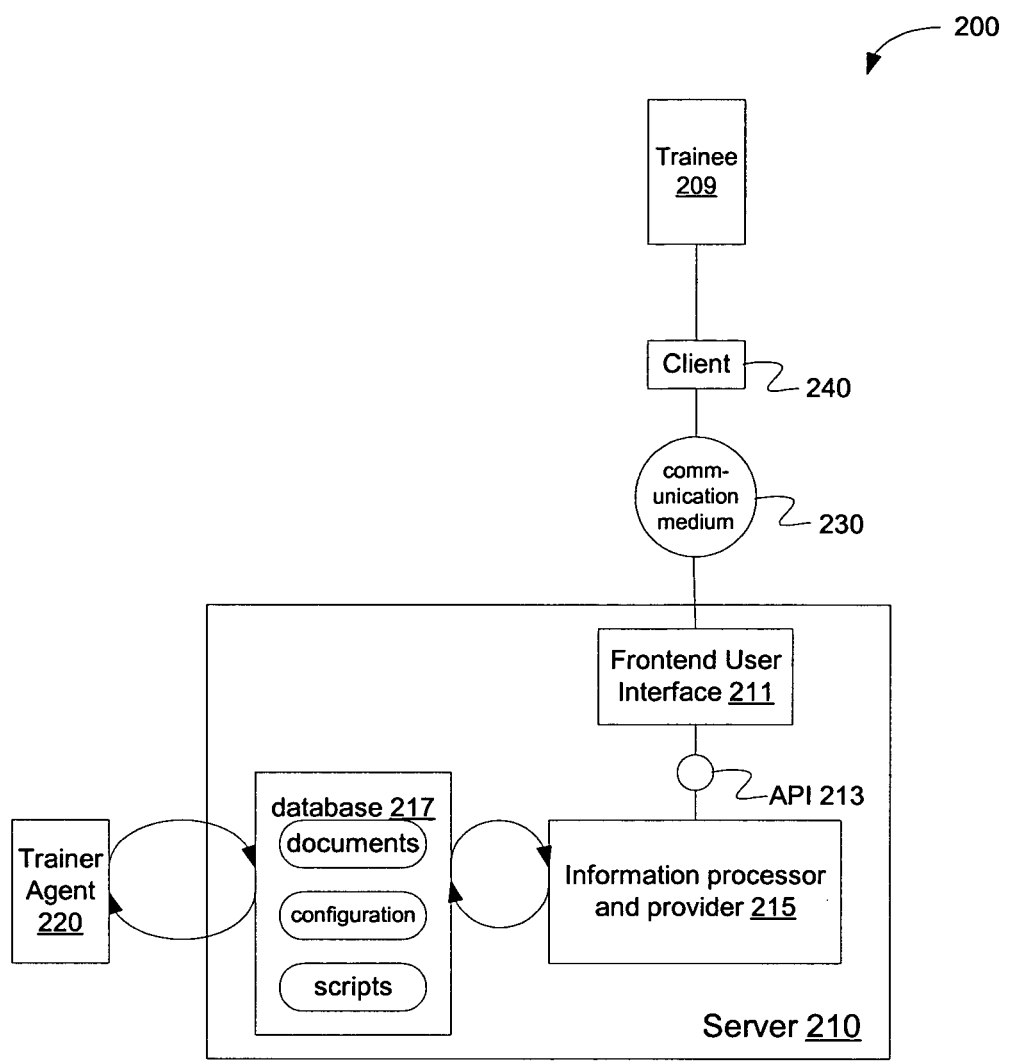
FIG. 2 illustrates one embodiment of a system usable with the present invention.

FIG. 2 illustrates one embodiment of a system usable with the present invention. In one embodiment, the system 200 includes a server 210, a trainer agent 220, a client 240, and a communication medium 230 between the server 210 and the client 240. A trainee 209 interacts with the client 240, which may include a personal computer, a workstation, a personal digital assistant (PDA), etc. In one embodiment, the server 210 includes a frontend user interface 211, an application programming interface (API) 213, an information processor and provider 215, and a database 217. The frontend user interface 211 interfaces with the communication medium 230. The API 213 acts as an intermediary between the frontend user interface 211 and the information processor and provider 215. The information processor and provider 215 is communicably coupled to the database 217 to access and/or update information stored in the database 217. The database 217 may store information relevant to the training, such as presentation documents, configuration data, scripts, etc. The database 217 is also communicably coupled to the trainer agent 220. The trainer agent 220 may access and/or update the information stored in the database 217. In one embodiment, the trainer agent 220 is a software program.

Note that any or all of the components and the associated hardware illustrated in FIG. 2 may be used in various embodiments of the system 200. However, it should be appreciated that other configurations of the system 200 may include more or less devices than those shown in FIG. 2. Furthermore, the client 240, the server 210, and the trainer agent 220 may be communicably coupled to each other via wire or wireless links. Moreover, the client 240, the server 210, and the trainer agent 220 may be located together at the same site or separately at different sites.

In one embodiment, the trainee 209 takes the training via the client 240, which communicates with the server 210 via the communication medium 230. Through the frontend user interface 211 and the API 213, the information processor and provider 215 monitors the action performed by the trainee 209 during the training and dynamically adjusts the training in response to the action. Since the action of the trainee 209 is indicative of the current knowledge level of the trainee 209 and the progress the trainee 209 has made so far in the training, the information processor and provider 215 may dynamically adjust the training to meet the individual needs of the trainee 209 based on the action. For example, the information processor and provider 215 may change the level of detail of the presentation material of the training, the presentation speed of the training, and/or the level of explanation provided in the training, etc. The information processor and provider 215 may retrieve the appropriate documents and configuration information from the database 217 to put together the training. The information processor and provider 215 may also run one or more scripts from the database 217 to generate the individually tailored training. The trainer agent 220 may access and update the information in the database 217.

Figure 3:
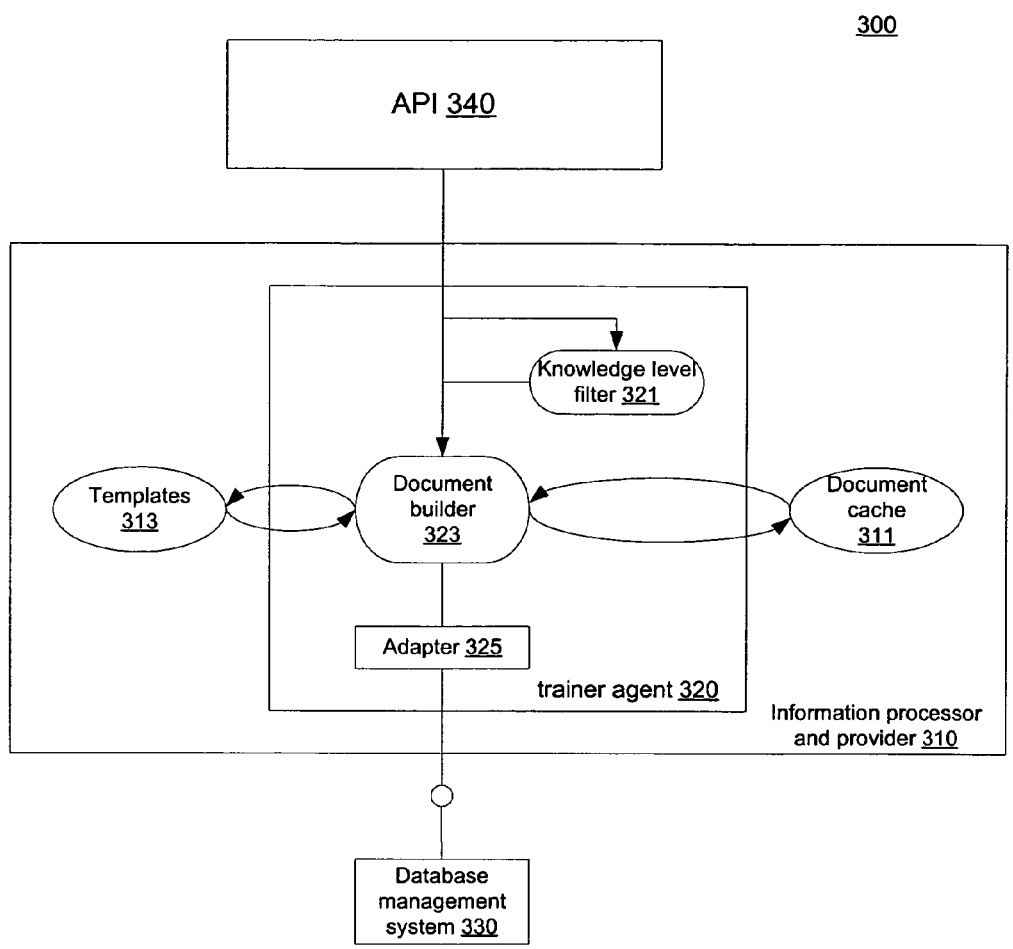
FIG. 3 shows an alternate embodiment of a system usable with the present invention.

FIG. 3 illustrates an alternate embodiment of a system usable with the present invention. The system 300 includes an information processor and provider 310, a trainer agent 320, a database management system 330, and an API 340. The information processor and provider 310 is coupled between the API 340 and the database management system 330. The trainer agent 320 further includes a knowledge level filter 321, a document builder 323, and an adapter 325. The knowledge level filter 321 is coupled between the API 340 and the document builder 323. The adapter 325 is coupled between the document builder 323 and the database management system 330. The document builder 323 is further coupled to a storage device for templates 313 and a document cache 311 within the information processor and provider 310.

Note that any or all of the components and the associated hardware illustrated in FIG. 3 may be used in various embodiments of the system 300. However, it should be appreciated that other configurations of the system 300 may include more or less devices than those shown in FIG. 3. Note that each component in the system 300 may be communicably coupled to another component via one or more wire or wireless links.

In one embodiment, the API 340 interfaces with a client (not shown) on which a trainee takes the training. Information on the trainee's action may be sent to the information processor and provider 310 and the trainer agent 320 via the API 340. The trainer agent 320 monitors the action of the trainee and uses the knowledge level filter 321 to determine the knowledge level of the trainee based on the trainee's action. Both the knowledge level and the action performed by the trainee are provided to the document builder 323. Using one or more templates from the storage device for templates 313 and one or more documents from the document cache 311, the document builder 323 puts together a set of training materials tailored to the individual trainee's knowledge level based on the action of the trainee. The document builder 323 may also access a database via the adapter 325 and the database management system 330 to retrieve the appropriate data and/or information (e.g., configuration information, scripts, etc.) to build the presentation materials for the trainee.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method to provide machine-assisted training to code SystemC, the method comprising:
   with a processor,
      collecting information from a trainee before starting the machine-assisted training to determine a trainee's knowledge level of SystemC;
      creating a knowledge model for the machine-assisted training based on the information collected from the trainee;
      monitoring action performed by the trainee during the machine-assisted training;

during the machine-assisted training, automatically causing the knowledge model to be updated in response to the action performed by the trainee; and during the machine-assisted training, automatically and dynamically adjusting the machine-assisted training based on the updated knowledge model, wherein dynamically adjusting the machine-assisted training comprises at least one of the following: changing a level of detail of presentation materials of the machine-assisted training, changing a presentation speed of the machine-assisted training, and changing a level of explanation in the machine-assisted training.

2. The method of claim 1, further comprising:
evaluating the trainee's knowledge level of SystemC after presenting to the trainee a predetermined portion of the machine-assisted training; and
dynamically adjusting the machine-assisted training based on the trainee's knowledge level.

3. The method of claim 2, further comprising:
allowing the trainee to move onto a next portion of the machine-assisted training if the trainee's knowledge level is at or above a predetermined level; and
requesting the trainee to repeat the predetermined portion of the machine-assisted training if the trainee's knowledge level is below the predetermined level.

4. The method of claim 2, further comprising:
dynamically generating an exercise for the trainee to complete based on the trainee's knowledge level.

5. A non-transitory machine-readable medium including instructions stored therein that, if executed by a processor, will cause the processor to perform operations comprising:
creating a knowledge model for a machine-assisted training to code SystemC based on information collected from a trainee before starting the machine-assisted training, wherein the information collected from the trainee includes the trainee's knowledge level of SystemC;
monitoring action performed by the trainee during the machine-assisted training;
during the machine-assisted training, automatically causing the knowledge model to be updated in response to the action performed by the trainee; and during the machine-assisted training, automatically and dynamically adjusting the machine-assisted training based on the updated knowledge model, wherein dynamically adjusting the machine-assisted training comprises at least one of the following: changing a level of detail of presentation materials of the machine-assisted training, changing a presentation speed of the machine-assisted training, and changing a level of explanation in the machine-assisted training.

6. The non-transitory machine-readable medium of claim 5, further comprising:
customizing the machine-assisted training based on the information collected from the trainee before starting the machine-assisted training.

7. The non-transitory machine-readable medium of claim 5, further comprising:
evaluating the trainee's knowledge level of SystemC after presenting to the trainee a predetermined portion of the machine-assisted training; and
dynamically adjusting the machine-assisted training based on the trainee's knowledge level.

8. The non-transitory machine-readable medium of claim 7, further comprising:
allowing the trainee to move onto a next portion of the machine-assisted training if the trainee's knowledge level is at or above a predetermined level; and
requesting the trainee to repeat the predetermined portion of the machine-assisted training if the trainee's knowledge level is below the predetermined level.

9. The non-transitory machine-readable medium of claim 7, further comprising:
dynamically generating an exercise for the trainee to complete based on the trainee's knowledge level.

10. A system comprising:
a client to collect information from a trainee to enable machine-assisted training to code SystemC, wherein the information collected from the trainee includes
information collected from the trainee before starting the machine-assisted training of the trainee's knowledge level of SystemC, the information used to create a knowledge model for the machine-assisted training and
information related to actions performed by the trainee during the machine-assisted training;
a user interface communicably coupled to the client to receive the information; and
a processor to use the information collected from the trainee before starting the machine-assisted training to create the knowledge model before starting the machine-assisted training and to automatically update the knowledge model in response to the action performed by the trainee, the processor automatically and dynamically adjust the machine-assisted training based on the information related to the actions performed by the trainee during the machine-assisted training, wherein dynamically adjusting the machine-assisted training comprises at least one of the following: changing a level of detail of presentation materials of the machine-assisted training, changing a presentation speed of the machine-assisted training, and changing a level of explanation in the machine-assisted training.

11. The system of claim 10, further comprising:
a database communicably coupled to the processor to store documents, configuration information, and scripts, wherein the processor is operable to access the database to retrieve one or more of the documents, the configuration information, and the scripts to modify presentation materials of the machine-assisted training.

12. The system of claim 11, further comprising:
a trainer agent communicably coupled to the database to update the documents, the configuration information, and the scripts stored on the database.

13. The system of claim 12, wherein the trainer agent comprises:
a document builder to put together the presentation materials.

14. The system of claim 13, wherein the trainer agent comprises:
a knowledge level filter to determine the knowledge level of the trainee based on the actions performed by the trainee.

15. The method of claim 1, wherein
a questionnaire is used to collect information from the trainee before starting the machine-assisted training.

16. The method of claim 1, wherein
the knowledge model includes a plurality of knowledge areas with each of the knowledge areas having a plurality of knowledge levels.

17. The method of claim 1, wherein
SystemC includes a class library for hardware design of circuits.

18. The method of claim 1, wherein
the machine-assisted training is customized to one or more of
substance of presentation materials of the training, annotations to the presentation materials, and a presentation speed of the training.

19. The non-transitory machine readable medium of claim 5, wherein
SystemC includes a class library for hardware design of circuits.

20. The system of claim 10, wherein
SystemC includes a class library for hardware design of circuits.

21. The method of claim 1, wherein
the training is to code in SystemC for hardware design of circuits.

22. The non-transitory machine readable medium of claim 5, wherein
the machine assisted training to code in SystemC is for hardware design of circuits.

23. The system of claim 10, wherein
the machine assisted training to code in SystemC is for hardware design of circuits.

* * * * *